United States Patent
Hyrenbach

(10) Patent No.: US 10,056,740 B2
(45) Date of Patent: Aug. 21, 2018

(54) GAS COOLER FOR A MEDIUM VOLTAGE SWITCHGEAR ASSEMBLY

(71) Applicant: ABB TECHNOLOGY AG, Zurich (CH)

(72) Inventor: Maik Hyrenbach, Ratingen (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/863,461

(22) Filed: Sep. 24, 2015

(65) Prior Publication Data
US 2016/0013624 A1    Jan. 14, 2016

Related U.S. Application Data

(63) Continuation of application No. PCT/EP2014/000800, filed on Mar. 25, 2014.

(30) Foreign Application Priority Data

Mar. 25, 2013    (EP) .................... 13001514

(51) Int. Cl.
| | | |
|---|---|---|
| H02B 1/56 | (2006.01) | |
| H01H 9/52 | (2006.01) | |
| H02G 5/10 | (2006.01) | |

(52) U.S. Cl.
CPC .............. H02B 1/56 (2013.01); H01H 9/52 (2013.01); H02G 5/10 (2013.01)

(58) Field of Classification Search
CPC ............. H02B 1/56; H02B 13/04; H01H 9/52
USPC .... 361/678, 137, 12, 679.49, 690, 696, 701; 165/72–75
See application file for complete search history.

(56) References Cited

U.S. PATENT DOCUMENTS

| | | | | |
|---|---|---|---|---|
| 7,054,143 | B2 * | 5/2006 | Eiselt | H02B 13/025 218/155 |
| 7,213,402 | B2 * | 5/2007 | Bellemo | B01D 53/265 62/271 |
| 2003/0213586 | A1 | 11/2003 | Keller et al. | |
| 2005/0007742 | A1 | 1/2005 | Pleines et al. | |
| 2009/0151711 | A1 * | 6/2009 | Wells | F24B 7/025 126/523 |
| 2010/0044346 | A1 | 2/2010 | Mauroux et al. | |

FOREIGN PATENT DOCUMENTS

| | | |
|---|---|---|
| CN | 1458816 A | 11/2003 |
| CN | 102210075 A | 10/2011 |
| CN | 202003871 U | 10/2011 |
| DE | 3341584 A1 | 6/1984 |
| DE | 19619060 A1 | 11/1997 |

(Continued)

OTHER PUBLICATIONS

International Search Report, PCT/EP2014/000800, dated Jul. 1, 2014.

*Primary Examiner* — Mukund G Patel
(74) *Attorney, Agent, or Firm* — Leydig, Voit & Mayer, Ltd.

(57) ABSTRACT

TA gas cooler for a medium voltage switchgear assembly with a gas compartment, having a housing with a hollow body for accommodating the heated gas, which flows through the medium voltage switchgear assembly and is heated by at least one heat-generating current conductor, wherein the hollow body of the housing is divided at least partly in several parallel hollow bodies, which are shaped as fins.

13 Claims, 1 Drawing Sheet

(56) References Cited

FOREIGN PATENT DOCUMENTS

| | | |
|---|---:|---|
| DE | 102006032396 A1 | 1/2008 |
| DE | 102008057237 A1 | 5/2010 |
| EP | 1237246 A1 | 9/2002 |
| EP | 1496534 B1 | 1/2005 |
| EP | 2157590 B1 | 2/2010 |
| GB | 569088 A | 5/1945 |
| JP | 60157994 U | 10/1988 |
| JP | 08223719 A | 8/1996 |
| JP | 2001112127 A | 4/2001 |

\* cited by examiner

GAS COOLER FOR A MEDIUM VOLTAGE SWITCHGEAR ASSEMBLY

CROSS-REFERENCE TO RELATED APPLICATIONS

This application is a continuing application of International Application No. PCT/EP2014/000800, filed under 35 U.S.C. § 371 on Mar. 25, 2014, and claiming benefit to European Patent Application No. 13 001 514.2, filed on Mar. 25, 2013, each of which is incorporated in its entirety herein. The international application was published in English on Oct. 2, 2014, as WO 2014/154351 A1 under PCT Article 21(2).

FIELD

The invention relates to a gas cooler for a medium voltage switchgear assembly with a gas compartment, comprising a housing with a hollow body for accommodating the heated gas, which flows through the medium voltage switchgear assembly and is heated by at least one heat-generating current conductor,

BACKGROUND OF THE INVENTION

Medium voltage switchgear assemblies may be provided for rated voltages between 1 kV and 72 kV. High voltage switchgear assemblies may be provided for rated voltages above 72 kV. Switchgear assemblies are utilized in order to distribute an energy flow and to ensure a safe operation within a power net. In order to control the energy flow a switchgear assembly may provide several functions, such as disconnecting, closing and grounding.

Switchgear assemblies may be categorized in gas insulated devices and air insulated devices. In general, air insulated devices may need more space when installed compared to gas insulated devices, since the gas, such as sulfur hexafluoride (SF6) or others, provides improved insulating characteristics compared to air. These differences may influence the dimensions of the switchgear assembly and therefore gas insulated switchgear assemblies may provide a more compact design.

At nominal currents above 1250 A ohmic losses in gas insulated switchgear assemblies are reaching a level, where special measures have to be taken for supporting the heat transfer. These are for example the use of heat sinks inside the gas compartment, conductors with higher cross section and/or painted conductors.

At higher levels, depending very much on the general design of the switchgear assembly, this is no longer sufficient for the heat transfer, because the heat has to pass the housing of the encapsulations. The surface of the housing is defined by the encapsulated volume and in most designs made of plain sheet metal.

According to the common knowledge of a skilled person a gas cooler for a medium voltage switchgear assembly has plain cooling areas with internal and external ribs, mainly made of aluminum. Normally the gas cooler consists of an additional hollow compartment, which is open to one side, with internal and external ribs, being connected to a switchgear gas compartment. The ribs are either part of the housing or connected to the housing as a separate part.

The document EP 1 496 534 B1 discloses a high-power switch with at least one switch pole for guiding and switching an electric current which flows in one current flow direction when the switch is in the closed state. The at least one switch pole contains along a longitudinal axis an inner conductor which carries the current and an outer conductor which is connected to earth potential and carries a return current in the opposite direction to the current. The outer conductor is in the form of a housing, which surrounds the inner conductor. A cooling rib arrangement which contains cooling ribs is provided on the outer conductor and is arranged at a radial distance from the inner conductor.

Furthermore, the document EP 2 157 590 B1 relates to an encapsulated high-voltage switch, containing a heat-generating current conductor, a metal encapsulation surrounding the current conductor, and a cooling element with a cooler. The cooling element is fixed on a part of the encapsulation that is embodied as a mounting plate. Furthermore the cooling element has cooling ribs arranged outside the encapsulation. In a section of the cooler that is embodied as a cooling block, at least a portion of the cooling ribs is arranged parallel to the mounting plate and is held on a heat distributor fixed to the mounting plate and embodied as a plate in such a way that on both sides of the heat distributor in each case one of two groups of cooling channels arises, in which the cooling channels are in each case arranged in the manner of a sandwich and orientated in a manner inclined relative to the horizontal.

SUMMARY

An aspect of the invention provides a as cooler for a medium voltage switchgear assembly, the gas cooler comprising: a gas compartment including a housing including a hollow body configured to accommodate heated gas, wherein the heated gas flows through the medium voltage switchgear assembly, wherein the heated gas is heated by at least one heat-generating current conductor, wherein the hollow body of the housing is divided at least partly in several parallel hollow bodies, shaped as fins, or wherein the fins are directly arranged on the housing.

BRIEF DESCRIPTION OF THE DRAWINGS

The foregoing and other aspects of the invention will become apparent following the detailed description of the invention, when considered in conjunction with the enclosed drawings.

FIG. 3b shows a transverse cut of the gas cooler in FIG. 3a.

DETAILED DESCRIPTION

Figure 1:
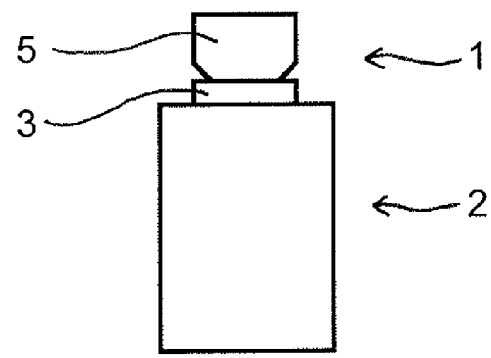
FIG. 1 shows a simplified depiction of a medium voltage switchgear assembly with a gas cooler.

The invention relates to a gas cooler for a medium voltage switchgear assembly with a gas compartment, comprising a housing with a hollow body for accommodating the heated gas, which flows through the medium voltage switchgear assembly and is heated by at least one heat-generating current conductor, An aspect of the invention provides a gas cooler for a medium voltage switchgear assembly, which shows a geometry for increasing the surface of a housing of the gas cooler significant, without using ribs or heat sinks.

According to an aspect of the invention the hollow body of the housing is divided at least partly in several parallel hollow bodies, which are shaped as fins, or that the fins are directly arranged on the housing. As a result, the number of heat transferring surfaces is significantly increased. In each fin there is heat transfer by convection and radiation. Each fin has two large heat transferring surfaces which are arranged parallel to each other. Thereby, a hollow interior is created, in which heated gas is filled.

An important embodiment of the invention in general is, the fins are implemented into a cover plate or a partial housing (4), which is not integral part of the switchgear assembly (2), but separate, and therefore detachable and closable part of switchgear assembly.

This is important in comparison to the EP 1 237 246 A1, because in that state of the art document folded side walls are used and not hollow bodies. So that the cooling structure is integral part of the switchgear housing, which has disadvantages.

A larger distance between two fins may improve the cooling condition at the large heat transferring surface of the fins, but if the space between two fins increases, the number of fins has to decrease for maintaining the same dimension of the gas cooler. The dimensions, especially a width of the fins and the distance between two fins, are defined by the internal and external gas flow and by limitations of the production system.

Moreover, the fins are made of plain sheet metal. Thus, the wall thickness of the fins is low and the heating and cooling fast. Furthermore, the manufacturing of the fins is simple and time saving.

Preferably, the fins are coated for increasing heat radiation. The coating may be paint or metal coating. Furthermore, the fins are coated as well inside as outside. A single-sided coating is possible as well.

The gascooler is arranged vertically or horizontally, or even the opening to the gasroom are arranged on the bottom side or laterally.

According to a preferred embodiment, the fins continue or exceed the geometry of the gas compartment. Continuing the geometry of the gas compartment results in a compact total dimension of the gas cooler. Exceeding the geometry of the gas compartment may improve the cooling conditions.

According to a further preferred embodiment the gascooler is directly connected to the surface of the gas compartment or to an additional compartment. A direct connection supports the gas flow to the fins. It is possible as well to realize the connection by welding.

Therefore it is especially advantageous if the plain sheet metal is steel or stainless steel. Nevertheless it is possible to form the fins of aluminium, because of the lower thermal resistance. Even though the thermal resistance of steel and stainless steel in comparison to aluminum is higher, the much easier manufacturing, especially the welding process makes steel and stainless steel more advantageous than aluminium.

Furthermore, the medium voltage switchgear assembly comprises at least one gas cooler, which is mountable connected to the medium voltage switchgear assembly. A mountable connection may be realized by screws and other connection means, which allowed to disconnect the gas cooler from the switchgear assembly. Furthermore, the medium voltage switchgear assembly is preferably gas insulated.

According to a further preferred embodiment the gas cooler is fixed connected to the medium voltage switchgear assembly. A fixed connection may be realized by rivets or welding.

The reference symbols used in the drawings, and their meanings, are listed in summary form in the list of reference symbols. All drawings are schematic.

FIG. 1 shows a medium voltage gas insulated switchgear assembly 2 with a gas cooler 1, which is arranged vertical on the top of the medium voltage switchgear assembly 2. In order to control the energy flow, the medium voltage switchgear assembly 2 provides several functions, such as disconnecting, closing and grounding. Because of the ohmic losses at nominal currents above 1250 A the gas is heated up by heat-generating current conductors and has to be cooled down in the gas cooler 1. The gas cooler 1 has a gas compartment 3, comprising a housing 4 with a hollow body for accommodating the heated gas. So important is, that the gas cooler 1, as well as the fins 5a-5e of the gas cooler are not integral part of the switchgear assembly 2, but a separate detachable and closable separate part of the switchgear assembly, or the switchgear assembly housing.

Figures 2A, 2B:
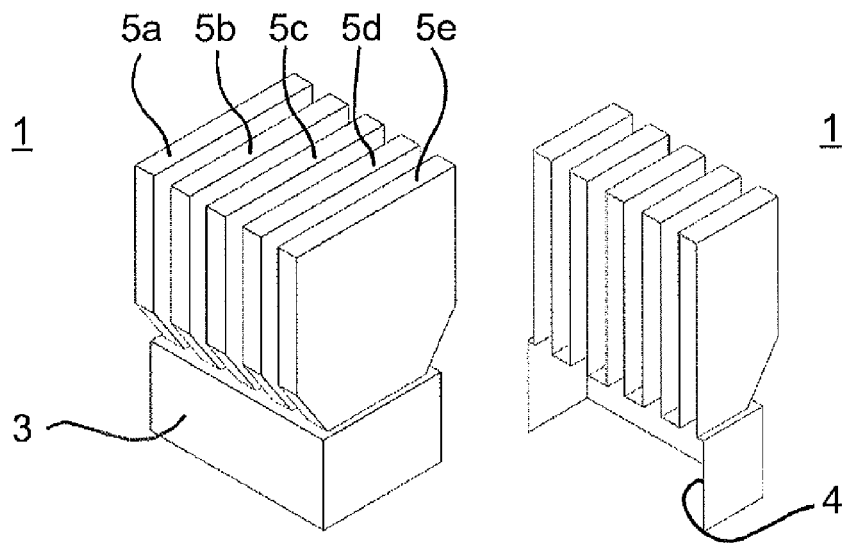
FIG. 2a is a perspective view of the gas cooler in FIG. 1.
FIG. 2b shows a longitudinal cut of the gas cooler in FIG. 2a, FIG. 3a is a perspective view of another embodiment of the gas cooler.

According to FIG. 2a the gas cooler 1 of FIG. 1 is represented enlarged and in detail. The hollow body of the housing 4 is divided in several parallel hollow bodies, which are shaped in the form of fins 5a, 5b, 5c, 5d and 5e. In each fin 5a, 5b, 5c, 5d and 5e there is heat transfer by convection and radiation. The gas cooler 1 comprises five fins 5a, 5b, 5c, 5d and 5e which are arranged on the upper side of the gas compartment 3. The fins 5a, 5b, 5c, 5d and 5e are arranged symmetrical, or can also be arranged asymmetrically and are made of plain sheet metal. Furthermore, the fins 5a, 5b, 5c, 5d and 5e are coated for increasing radiation.

FIG. 2b shows a longitudinal cut of the gas cooler 1 in FIG. 2a. Thus it appears that a wall thickness of the housing 4 is very low. The fins 5a, 5b, 5c, 5d and 5e are directly connected to the surface of the gas compartment 3 and exceed the geometry of the gas compartment 3.

Figures 3A, 3B:
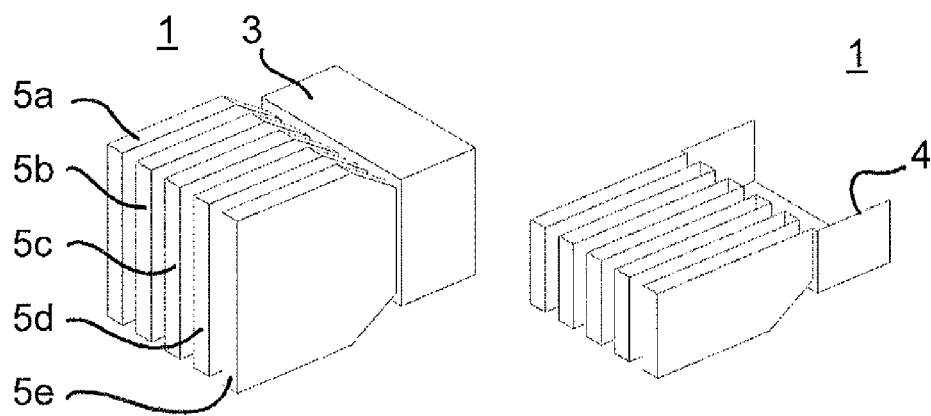

In FIG. 3a can be seen another embodiment of the gas cooler 1. The gas cooler is arranged horizontally at the rear side of the gas compartment 3. It can be seen, that also in this position, the fins 5a, 5b, 5c, 5d and 5e remains vertically arranged in such, that a vertical cooling stream is perpetuated between the fins.

FIG. 3b shows a transverse cut of the gas cooler 1 in FIG. 3a. Thus it appears that a wall thickness of the housing 4 is very low.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims. In particular, the fins 5 may continue the geometry of the gas compartment 3. Furthermore, the fins 5 may be directly connected to the surface of an additional compartment, like an integrated gas compartment of the medium voltage switchgear assembly 2. The number of fins 5 is not restrictive and the geometry of the fins 5 may differ. Essentially is that the hollow body of the housing 4 is divided at least partly in several parallel hollow bodies, which are shaped in the form of fins 5 and have large heat transferring surfaces.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

REFERENCE SIGNS 1 gas cooler
2 medium voltage switchgear assembly
3 gas compartment
4 housing
5a-e fins

The invention claimed is:

1. A gas cooled switchgear system comprising:
a switchgear assembly having an interior;
a gas compartment including a hollow housing forming an area to accommodate heated gas and a plurality of parallel hollow fins extending from an upper side of the housing, an interior of each of the plurality of hollow fins communicating with the gas compartment,
wherein the housing is detachably disposed on the switchgear assembly without being an integral part of the switchgear assembly such that the gas compartment of the housing communicates with the interior of the switchgear assembly such that heated gas from the interior of the switchgear assembly flows into the gas compartment and the fins,
wherein a bottom of each fin of the plurality of fins has a smaller cross-section at a side of the fin closest to the gas compartment and a larger cross-section at a side of the fin farthest from the gas compartment.

2. The gas cooled switchgear system of claim 1, wherein the fins are directly arranged on the housing.

3. The gas cooled switchgear system of claim 1, wherein the fins are arranged symmetrically.

4. The gas cooled switchgear system of claim 1, wherein the fins include a plain sheet metal.

5. The gas cooled switchgear system of claim 1, wherein the fins are made of plain sheet metal.

6. The gas cooled switchgear system of claim 4, wherein the plain sheet metal is steel or stainless steel.

7. The gas cooled switchgear system of claim 4, wherein the plain sheet metal includes steel.

8. The gas cooled switchgear system of claim 6, wherein the fins are made of deep drawn profiles.

9. The gas cooled switchgear system of claim 1, wherein the fins are coated so as to increase radiation.

10. The gas cooled switchgear system of claim 1, wherein the fins are arranged vertically.

11. The gas cooled switchgear system of claim 1, wherein the fins are arranged horizontally.

12. The gas cooled switchgear system of claim 1, wherein the fins continue or exceed the geometry of the gas compartment.

13. The gas cooled switchgear system of claim 1, wherein the gas compartment is connected in a fixed manner to the switchgear assembly.

* * * * *